H. G. HUFFMAN.
REEL CLAMP.
APPLICATION FILED SEPT. 22, 1908.
930,181.
Patented Aug. 3, 1909.
2 SHEETS—SHEET 1.
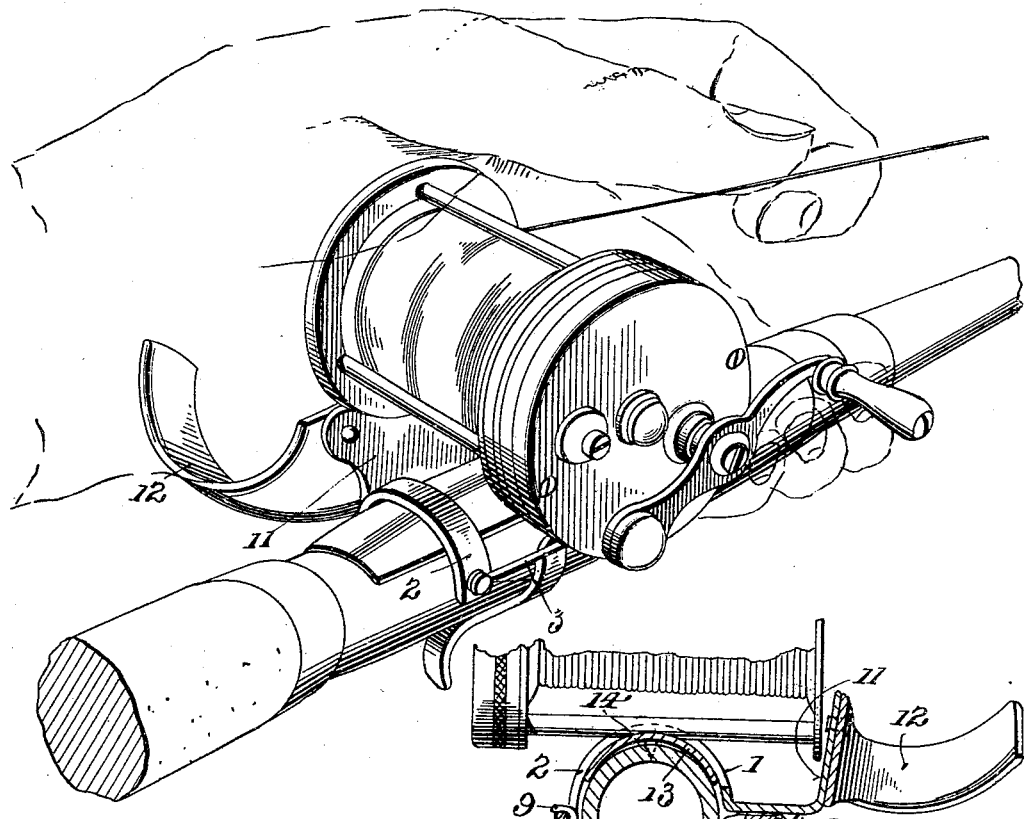
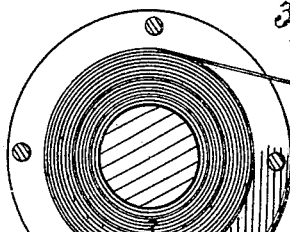
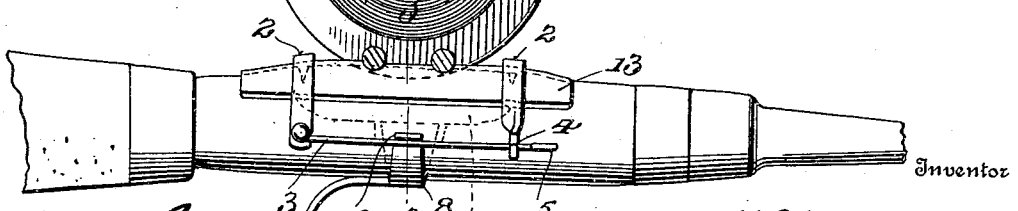
Witnesses
Inventor
H. G. Huffman
By
Attorneys H. G. HUFFMAN.
REEL CLAMP.
APPLICATION FILED SEPT. 22, 1908.
930,181.
Patented Aug. 3, 1909.
2 SHEETS—SHEET 2.
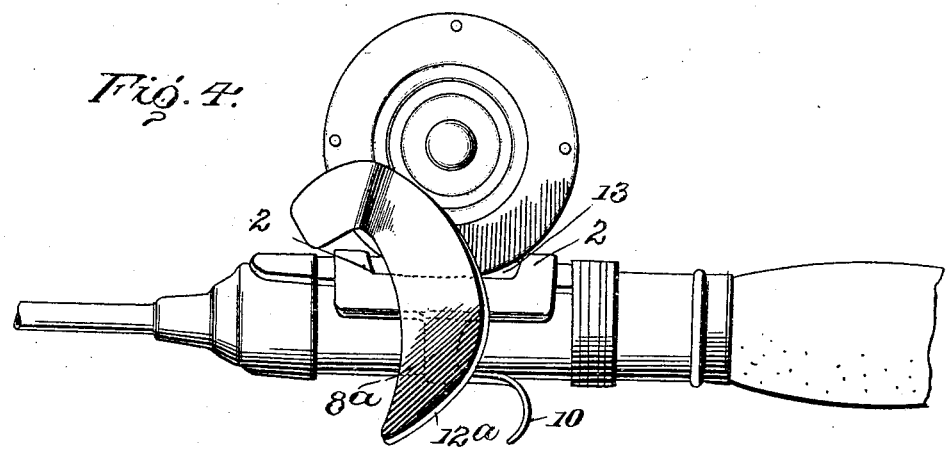
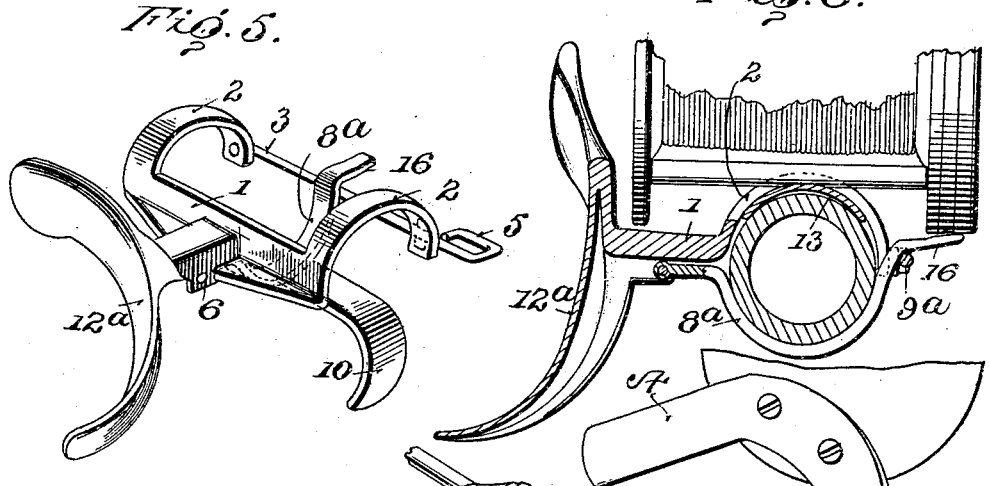
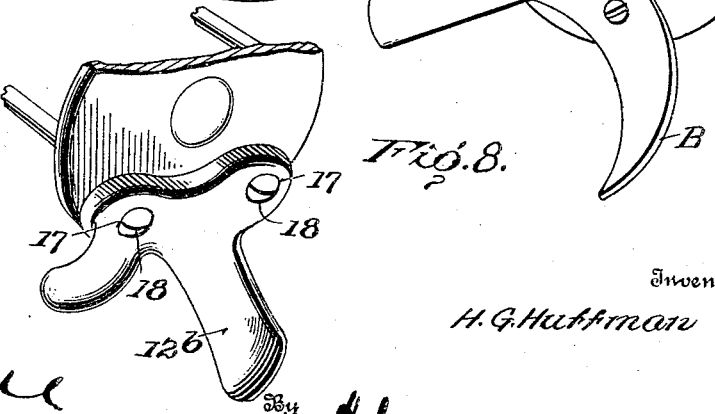
Inventor
H. G. Huffman

UNITED STATES PATENT OFFICE.

HARMON G. HUFFMAN, OF YOUNGSTOWN, OHIO.

REEL-CLAMP.

No. 930,181.      Specification of Letters Patent.      Patented Aug. 3, 1909.

Application filed September 22, 1908. Serial No. 454,172.

*To all whom it may concern:*

Be it known that I, HARMON G. HUFFMAN, citizen of the United States, residing at Youngstown, in the county of Mahoning and State of Ohio, have invented certain new and useful Improvements in Reel-Clamps, of which the following is a specification.

This invention comprehends certain new and useful improvements in fishing rods and reels and the invention has for its primary object an improved construction of reel and rod structure in the nature of a hand rest, combined with a reel clamp and finger hook.

The invention also has for its object a simple and durable construction of reel clamp which does away with the ordinary hood and reel seat ring ordinarily employed and which is preferably provided with a finger hook secured to or formed integral with one of the members of the clamp. And a further object of the invention is a simple hand rest which may be secured to the reel or form a part of the reel clamp and which is designed for use in winding up the line after a cast has been made.

With these and other objects in view as will more fully appear as the description proceeds, the invention consists in certain constructions, combinations and arrangements of parts that I shall hereinafter describe and claim.

For a full understanding of the invention and the merits thereof and also to acquire a knowledge of the details of construction and the means for effecting the result, reference is to be had to the following description and accompanying drawings, in which:

Figure 1 is a perspective view of one form of my invention, Fig. 2 is a longitudinal sectional view of a reel illustrating said embodiment of the invention in side elevation, Fig. 3 is a transverse sectional view through the device, the section being taken on the line 3—3 of Fig. 2, Fig. 4 is a side elevation of a modified form of the device, Fig. 5 is a perspective view of such form detached, Fig. 6 is a transverse sectional view through the device illustrated in Figs. 4 and 5, Fig. 7 is a perspective view of another modification illustrating the hand rest directly attached to the reel, Fig. 8 is a detail view of another form of hand rest directly attached to one of the side plates of a reel.

Corresponding and like parts are referred to in the following description and indicated in all the views of the drawings by the same reference character.

My improved reel clamp comprises a main or body member 1 which is bifurcated to form curved arms 2 designed to extend partially around the handle of a rod over a seat strap of a reel. A spring latch 3 is secured at one end to one of the curved arms 2 and is designed for locking engagement in one of a series of notches or keepers 4 formed in the other arm. The free end of the latch 3 is formed with a finger piece 5 of any desired construction.

The main member 1 of the clip or clamp is formed with apertured ears 6, and a pintle 7 extends through said ears and also through the curved end of the pivoted member 8 of said clamp. This pivoted member is designed to extend around the opposite side of the rod from the curved arms 2 so as to completely encircle the rod, and said pivot member is formed at its extremity with a lug or keeper 9 which is arranged for position between the ends of the arms 2 and which is designed for engagement with the spring latch 3, so as to securely hold the clamp in locked position. The pivoted member 8 of the clamp carries a finger hook 10 which may be secured thereto in any desired way or formed integral therewith. The main or body member 1 of the clamp is formed with a bracket extension 11 designed to extend upwardly toward the reel at the left hand side thereof, and a hand rest 12 is secured to this bracket extension in any desired way, as by screws or other fastening devices. This member 12 is curved as shown and is designed to fit the palm and back of the hand of the operator near the wrist.

13 designates the reel strap.

In the practical use of a combined reel clamp, finger piece and hand rest, as above described and illustrated in the accompanying drawings, the curved arms 2 are extended over the ends of the reel strap 13 and the pivoted member 8 of the clamp is swung toward the closed position, the latch 3 being then swung so as to extend over the lug 9 of the pivoted member 8, the latch being secured in any one of the notches or keepers 4 so as to securely hold the clamp in locked position. The finger hook 10 will then be in the proper position for use.

It is well known that in the art of bait casting from the reel it becomes necessary to lay the line evenly on the reel preceding each cast. In order to make this accomplishment easy, my improved hand rest is provided. In laying the line on the reel, the rod is grasped loosely with the second, third, and fourth fingers of the left hand just in advance of the reel, while the back and outer portion of the palm rests lightly in the crotch of the hand rest 12. It will thus be understood that the first finger and thumb remain free above the rod so as to oscillate back and forth with the line passing between them, thereby distributing the line evenly from one end to the other of the reel.

If desired, the reel strap 13 may be provided with spurs 14 designed to penetrate the rod or be received in openings specially formed in the rod for said spurs. If desired the pivoted member 8 of the clamp may also be provided with a corresponding spur 15 so as to effectively prevent any twisting of the reel on the rod after it has been secured in place by the clamp. It is obvious that the spurs may be formed on the rod, if desired and the sockets for them formed on the reel strap and clamp member, or the spurs may be omitted entirely either upon the strap or pivoted member of the clamp. In the event that the spurs are omitted, I propose to extend the pivot member 8ᵃ of the clamp beyond the latch 9ᵃ thereof to form a tongue 16 engaging the reel, as clearly illustrated in Fig. 6, to prevent the device from twisting on the rod. In addition to this modification of the device, this figure illustrates a slightly different form of hand rest, designated 12ᵃ, it being understood that these hand rests may be of any desired shape or design so as to fit any hand. It is also to be understood that my invention comprehends the use of a hand rest connected directly to the rod or reel instead of forming part of the reel clamp. Such an arrangement of parts is illustrated in Fig. 7, in which 12ᵇ designates the hand rest formed with openings 17 extending therethrough for the reception of screws 18 which are a part of the reel and which may be used, in addition to their primary purpose, as means for securing the hand rest to the reel.

As illustrated in Fig. 8, it is evident that the forwardly extending arm A of the hand rest may be lengthened if desired, in which event the rearwardly extending arm B may be correspondingly shortened or omitted altogether.

My invention is not limited to the formation of a finger hook on the reel clamp, as the reel clamp may be an integral portion of the reel constructed separately from either said finger hook or hand rest.

Having thus described the invention, what is claimed as new is:

1. A reel clamp, comprising a main member provided with curved arms, a pivoted member connected to the main member and curved in an opposite direction from said arms and mounted between the same, and a latch secured to one of said arms, the other arm being formed with a notch for engagement with said latch, and the pivoted member being formed with a lug with which said latch is designed to engage.

2. A reel clamp, comprising a main member formed with curved arms, a pivoted latch secured at one end to one of said arms, the other arm being formed with a notch for engagement with the other end of said latch, and a pivoted member secured to the main member and formed with a lug over which the latch is designed to extend, as and for the purpose set forth.

3. A reel clamp, comprising a main member designed to extend partially around a fishing rod and over the reel strap, a pivoted member connected to the main member and designed to extend partially around the rod so as to encircle said rod with the main member, and means for securing said members together upon a rod, the pivoted member being formed with a tongue extending into engagement with the reel, for the purpose specified.

4. A reel clamp, comprising a main member formed with arms designed to partially encircle a rod, a pivoted latch secured at one end to one of the said arms, and a pivoted member secured to the main member and formed with a lug over which the latch is designed to extend, into engagement with the other arm of the main member, the pivoted member being designed to extend around a rod in a direction opposite to the arms of the main member so that the two members will encircle the rod.

5. The combination with a fishing rod and reel secured thereto, of a forwardly and upwardly curved hand rest, and means for securing said hand rest in a position at one side of the reel.

6. A reel clamp provided at one side with a bracket extension, and a hand rest secured to said extension and arranged to be held thereby in a position at one side of a rod.

7. A reel clamp, comprising a main member formed with curved arms, a pivoted spring latch secured at one end to one of said arms and arranged to engage the other arm, and a pivoted member secured to the main member and formed with a lug over which the spring latch is designed to extend.

In testimony whereof I affix my signature in presence of two witnesses.

HARMON G. HUFFMAN. [L. S.]

Witnesses:
DANIEL F. ANDERSON,
GUY MATHEWS.